(12) United States Patent
Ismailov

(10) Patent No.: US 8,146,855 B2
(45) Date of Patent: Apr. 3, 2012

(54) UNMANNED AIR VEHICLE

(75) Inventor: Anvar Ismailov, Montréal (CA)

(73) Assignees: Anvar Ismailov, Montreal, Quebec (CA); Muhabbat Ismailova, Montreal, Quebec (CA)

(*) Notice: Subject to any disclaimer, the term of this patent is extended or adjusted under 35 U.S.C. 154(b) by 588 days.

(21) Appl. No.: 12/230,638

(22) Filed: Sep. 3, 2008

(65) Prior Publication Data

US 2010/0051741 A1 Mar. 4, 2010

(51) Int. Cl.
*B64C 3/56* (2006.01)

(52) U.S. Cl. ............. 244/49; 244/45 R; 244/46; 244/63; 244/3.27

(58) Field of Classification Search ............ 244/63, 244/49, 45 R, 46, 218, 219, 3.27, 3.28, 3.29
See application file for complete search history.

(56) References Cited

U.S. PATENT DOCUMENTS

| | | | |
|---|---|---|---|
| 3,957,230 A | | 5/1976 | Boucher et al. |
| 4,279,195 A | | 7/1981 | Miller |
| 4,410,151 A | * | 10/1983 | Hoppner et al. ............... 244/63 |
| 5,007,875 A | | 4/1991 | Dasa |
| 5,645,250 A | * | 7/1997 | Gevers ........................ 244/101 |
| 5,695,153 A | | 12/1997 | Britton et al. |
| 6,056,237 A | * | 5/2000 | Woodland .................... 244/3.15 |
| 6,119,976 A | | 9/2000 | Rogers |
| 6,392,213 B1 | * | 5/2002 | Martorana et al. ............. 244/3.1 |
| 7,014,141 B2 | | 3/2006 | Cox et al. |
| 7,089,843 B2 | | 8/2006 | Miller et al. |
| 7,097,137 B2 | | 8/2006 | McDonnell |
| 7,140,575 B2 | | 11/2006 | McGeer et al. |
| 7,210,654 B1 | | 5/2007 | Cox et al. |
| 7,273,001 B2 | | 9/2007 | Dekel |
| 2008/0149758 A1 | | 6/2008 | Colgren et al. |

OTHER PUBLICATIONS

Republic F-105 Thunderchief Wikipedia Article (http://en.wikipedia.org/wiki/Republic_F-105_Thunderchief) viewed on Mar. 22, 2011.*
Boeing F/A-18E/F Super Hornet Wikipedia Article (http://en.wikipedia.org/wiki/Boeing_F/A-18E/F_Super_Hornet) viewed on Mar. 17, 2011).*
Aircraft Carrier Wikipedia Article (http://en.wikipedia.org/wiki/Aircraft_carrier) viewed on Mar. 17, 2011.*
Tailhook Wikipedia Article (http://en.wikipedia.org/wiki/Tailhook) viewed on Mar. 22, 2011.*
Arresting Wire Wikipedia Article (http://en.wikipedia.org/wiki/Arresting_gear) viewed on Mar. 22, 2011.*

* cited by examiner

*Primary Examiner* — Timothy D Collins
*Assistant Examiner* — Jamie S Stehle
(74) *Attorney, Agent, or Firm* — Equinox Protection; Franz Bonsang

(57) ABSTRACT

An unmanned air vehicle for military, land security and the like operations includes a fuselage provided with foldable wings having leading edge flaps and trailing edge ailerons which are operable during ascent from launch to control the flight pattern with the wings folded, the wings being deployed into an open unfolded position when appropriate. The vehicle is contained within a pod from which it is launched and a landing deck is provided to decelerate and arrest the vehicle upon its return to land.

23 Claims, 11 Drawing Sheets

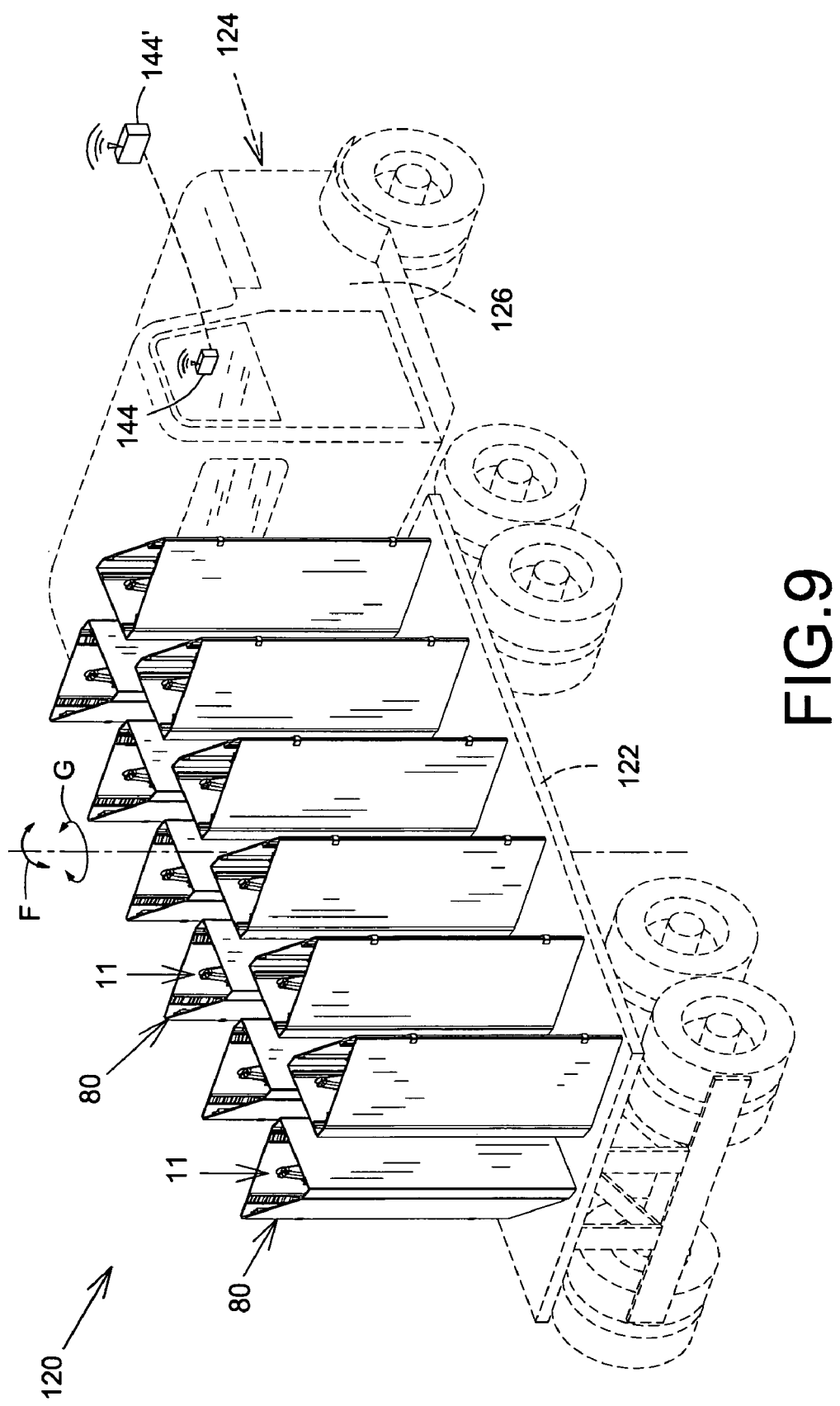

UNMANNED AIR VEHICLE

FIELD OF THE INVENTION

The present invention concerns an unmanned air vehicle (UAV) falling within the generic field of mobile robotic vehicles (MRV).

In particular, but not exclusively the present invention has reference to a UAV suitable for deployment in military and/or land security operations, specifically offensive operations in battles zones or theatres of war. Such UAVs are armed with weaponry for battlefield use. It is to be understood, however, that as with some conventional UAVs the present invention may be employed for reconnaissance, surveillance or indeed meteorological surveying and accordingly the invention is not limited to offensive ballistics.

BACKGROUND OF THE INVENTION

There are many and varied forms of UAVs currently available, but one among many important requirements is the mobility of the UAV and its ease of launch characteristics.

One proposal for a UAV is disclosed in U.S. patent Application Publication No. US 2008/0149758 to Colgren et al and comprises a monoplane type vehicle which is assemblable on site and which is principally devised for reconnaissance and the like activities. Although the monoplane is relatively simply constructed and capable of easy assembly with the facility of short take off and landing for short missions and also for longer range, it has certain obvious limitations in terms of its storage and launch features.

Accordingly, there is a need for an improved unmanned air vehicle.

SUMMARY OF THE INVENTION

It is therefore a general object of the present invention to provide an improved unmanned air vehicle (UAV).

A specific advantage of the present invention is that the UAV possesses the attribute of ease of mobility within its own compact storage pod.

Another advantage of the present invention is that the UAV is modularly assembled in a customized fashion to suit the specific mission needs, and therefore has a relatively wide range of different configurations readily available.

Another advantage of the present invention is that the UAV has foldable wings which are capable of assuming a substantially delta configuration in the folded mode when viewed along the fuselage of the UAV and which in the opened deployed mode display a substantially delta wing contour in plan view.

A further advantage of the present invention is that the UAV is easy to launch from any suitable site and moreover is capable of reliable return flight and capture.

An additional advantage of the present invention is that the UAV is self-powered during launch, typically with a jettisoned jet engine, and in outbound flight via at least one flight power engine, and preferably has a separate return power unit for the return flight.

An associated advantage of the present invention is the provision of a landing deck for receiving the returning UAV following an airborne mission.

Another advantage of the present invention is that the UAV has such a landing deck with retardation and arrest features.

A still further advantage of the present invention is that the UAV has in-flight controls together with the capacity for flight control during its launch trajectory.

Another advantage of the present invention is that the UAV has the means for carrying ordnance which may be in the form of air-to-air or air-to-ground wing-mounted missiles and conventional ballistics for example in the form of one or more fuselage-mounted machine guns or cannons.

Yet a further advantage of the present invention is the provision of a system of UAVs comprising a battery of UAVs capable of battlefield deployment and usage en masse for the protection of friendly forces and their armoured divisions and the destruction of opposing ground or air borne weaponry.

According to a first aspect of the invention there is provided an unmanned air vehicle comprising a fuselage provided with a nose adapted for the incorporation of inter alia surveillance equipment and/or ordnance, the fuselage also being provided with a tail plane with a rudder, to each side of the fuselage is attached a foldable wing adapted to carry further equipment and/or ordnance, each wing having controllable ailerons at its trailing edge, each aileron being adapted in use for individual control during outbound flight including the launch phase, a propulsive launch engine, and at least one flight power unit for flight. Preferably, a further return power unit for use during the return flight, and a pod for containing the vehicle, the pod being so constructed as to provide a launch platform for the vehicle.

Typically, each wing has controllable flaps at its leading edge that are adapted in use for individual control during outbound flight including the launch phase.

Each wing is conveniently tripartite with a root part being affixed to the fuselage and the two other parts being respectively contiguous one with the other and hinged together such as to give to the wing its foldability. The movement of the wing parts into the flight mode may be effected by deployment mechanisms. A clamp is provided to retain the wings in the folded position, the clamp being disposed on the tail plane which is capable of accommodating the clamp therewithin following its release from the wing tips. The wings or at least one or more parts thereof may be hollow and adapted to contain fuel tanks for one or both of the power units.

The propulsive launch engine may be a jet engine which will usually be jettisoned following launch. The flight power unit for flight may be a motor-driven propeller powered by a fuel fired engine or in stand-by mode the propeller may be electrically powered, the propeller being mounted in a protective nacelle to which the disposable jet engine will be releasably secured. Electrical power may be provided by a bank of batteries located within the fuselage.

The flaps and ailerons may be powered by suitable motors actuable by remote control either from the launch site and/or remote therefrom.

The UAV of the present invention is launched from within its containing pod with the wings in the folded condition and in that launch condition the flaps and ailerons are so adapted to effect flight control as they do during normal flight when the vehicle has reached operating altitude.

The ordnance mounted beneath the wings may be missiles or bombs, whilst the ordnance mounted in the nose of the fuselage may be machine guns or cannon provided with cartridge magazines. In this latter respect, the fuselage is so designed as to allow for the safe ejection of spent cartridges.

The tail end of the fuselage is provided with a hook deployable prior to landing for the purpose of engaging an arresting wire upon landing.

For the purpose of landing a deck is provided and incorporates a slideway in which is reciprocally mounted a detent adapted for interengagement with the hook upon landing, the detent being affixed to the arresting wire, which is connected to a braking mechanism. The deck may be angularly orientable.

The pod for containing the vehicle during its transport to the launch site is provided with support and guide rollers for ensuring that the vehicle maintains its designed path of trajectory upon launch.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein:

FIG. 9 is a schematic view of a mobile unit for carrying a squadron of UAVs.

DETAILED DESCRIPTION OF THE PREFERRED EMBODIMENTS

With reference to the annexed drawings the preferred embodiment of the present invention will be herein described for indicative purpose and by no means as of limitation.

Figure 1:
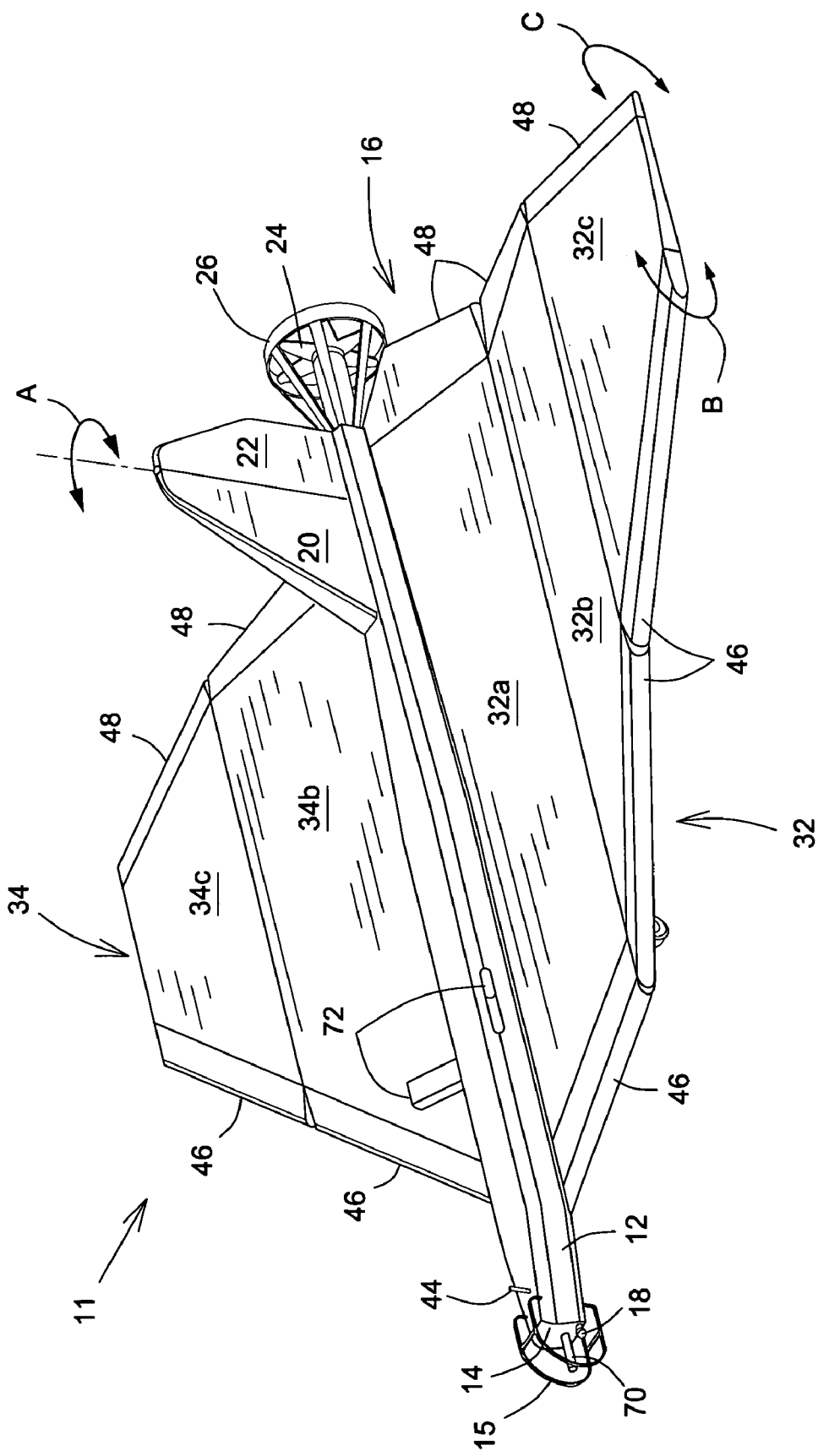
FIG. 1 is a diagrammatic perspective view of an unmanned air vehicle in accordance with an embodiment of the present invention depicting the UAV in a flight mode.
Figure 2:
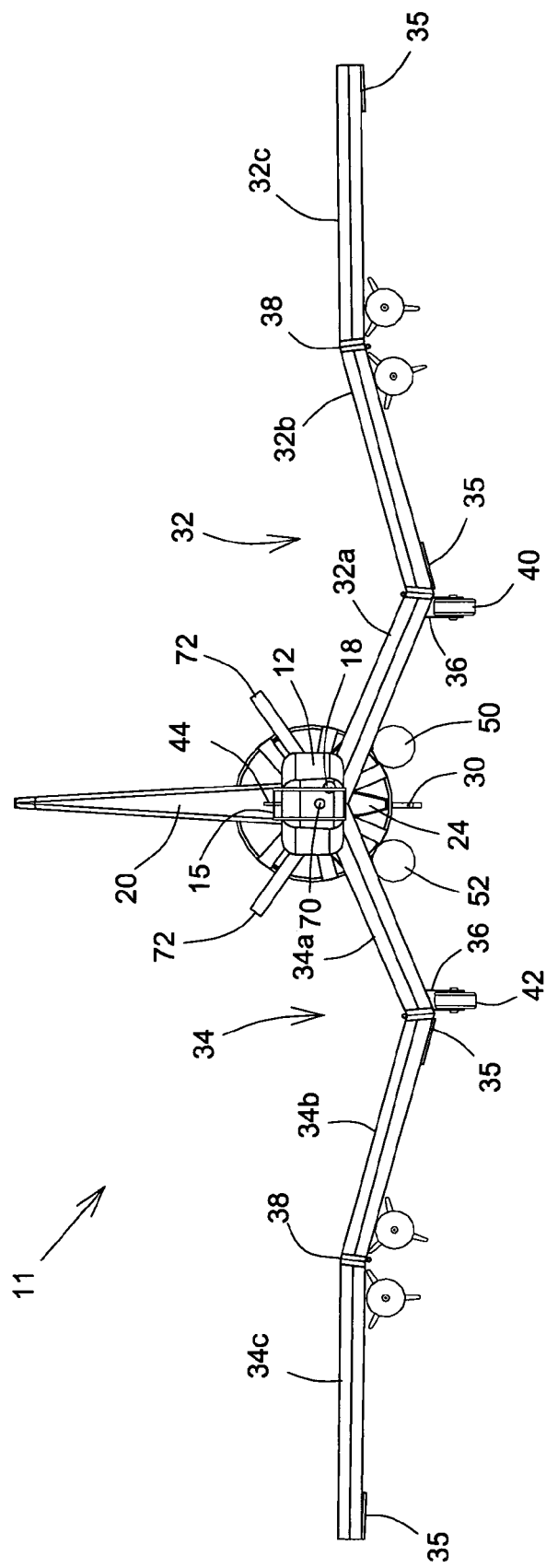
FIG. 2 is a an aft view of the UAV shown in FIG. 1.
Figure 3:
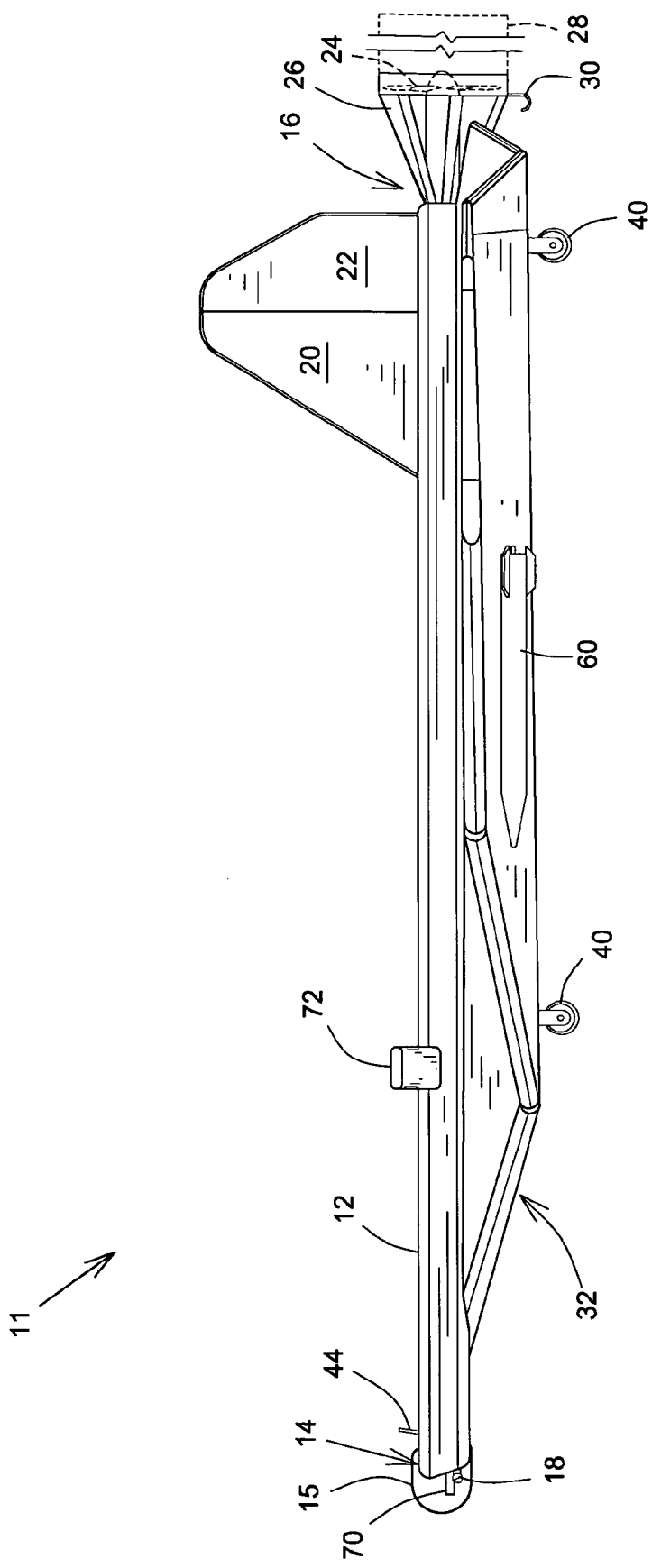
FIG. 3 is a side view of the UAV shown in FIG. 1.

Referring to FIGS. 1 to 7, there is illustrated generally at 11 an unmanned air vehicle (UAV) having a fuselage 12 with a nose section 14 having a protective cage 15 and a tail section 16, the former incorporating inter alia reconnaissance or surveillance equipment in the form of a preferably gimbaled camera 18 or the like sensing equipments and the latter having mounted thereon a tail plane 20 provided with an angularly controllable rudder 22 (see arrow A in FIG. 1). The tail section 16 also has mounted at its end a propeller 24 within a nacelle, or propeller guard structure 26 to which latter is releasably attached a launch jet engine 28 (FIGS. 3, 7 and 10), the latter allowing vehicle launches from aboard flying helicopters, if required. A landing hook 30 depends from the nacelle 26 as seen in FIG. 3 and functions as herein after described.

A conventional fuel motor/engine (not shown) for the propeller 24 is provided within the tail end of the fuselage as is a standby electric motor and batteries in the event of fuel starvation.

Figure 6:
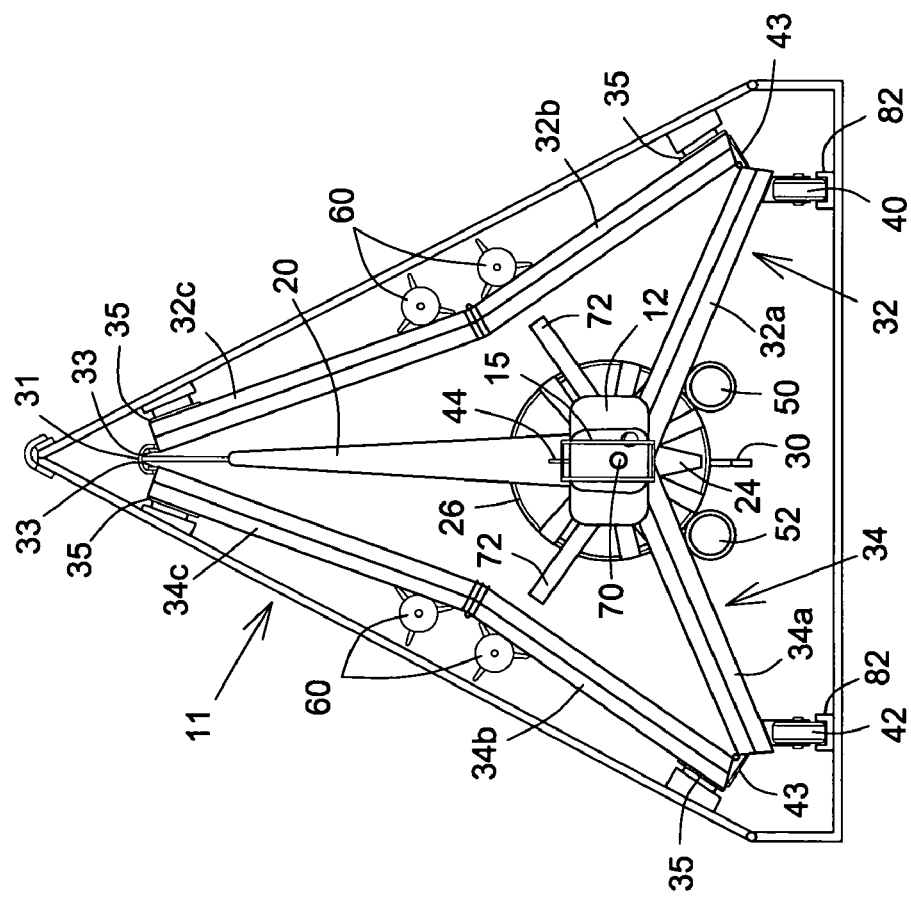
FIG. 6 is a front end view of the UAV shown in its launch pod.

On each side of the fuselage 12 is mounted a tripartite wing 32, 34. The root part 32a, 34a is fixed to the fuselage 12 with the succeeding contiguous parts 32b, 34b and 32c, 34c hinged connected one to the other as at 36, 38 respectively. Wheels 40, 42 are provided beneath the wings 32; 34 respectively and longitudinally spaced apart along the hinges 36, 38 on the port and starboard sides of the vehicle 11. A deployment mechanism 43 is provided at each hinge point 36 on both sides of the vehicle (FIG. 6).

At the leading edges of all parts of both wings 32, 34 there are provided leading edge flaps 46 and at the trailing edges of all parts of the wings 32, 34 there are provided ailerons 48. Each flap 46 and aileron 48 is independently angularly controllable via conventional mechanisms (not shown), as illustrated by arrows B and C in FIG. 1, respectively.

Beneath the wings depend at least one, preferably two port and starboard jet engines 50, 52 to power the return flight from the action location of the vehicle 11. The actual power of the jet engines 50, 52 could be variable depending on the specific mission needs, vehicle weight, flight conditions, landing type (such as net landing aboard flying helicopters), etc.

On the underside of the tips of both wing parts 32c, 34c and at the hinge points with the root parts of the wings are provided plates 35 of low friction material such as polytetrafluoroethylene (PTFE) polymer sold under the trade mark Teflon® for a purpose to be explained hereinafter.

Figure 4:
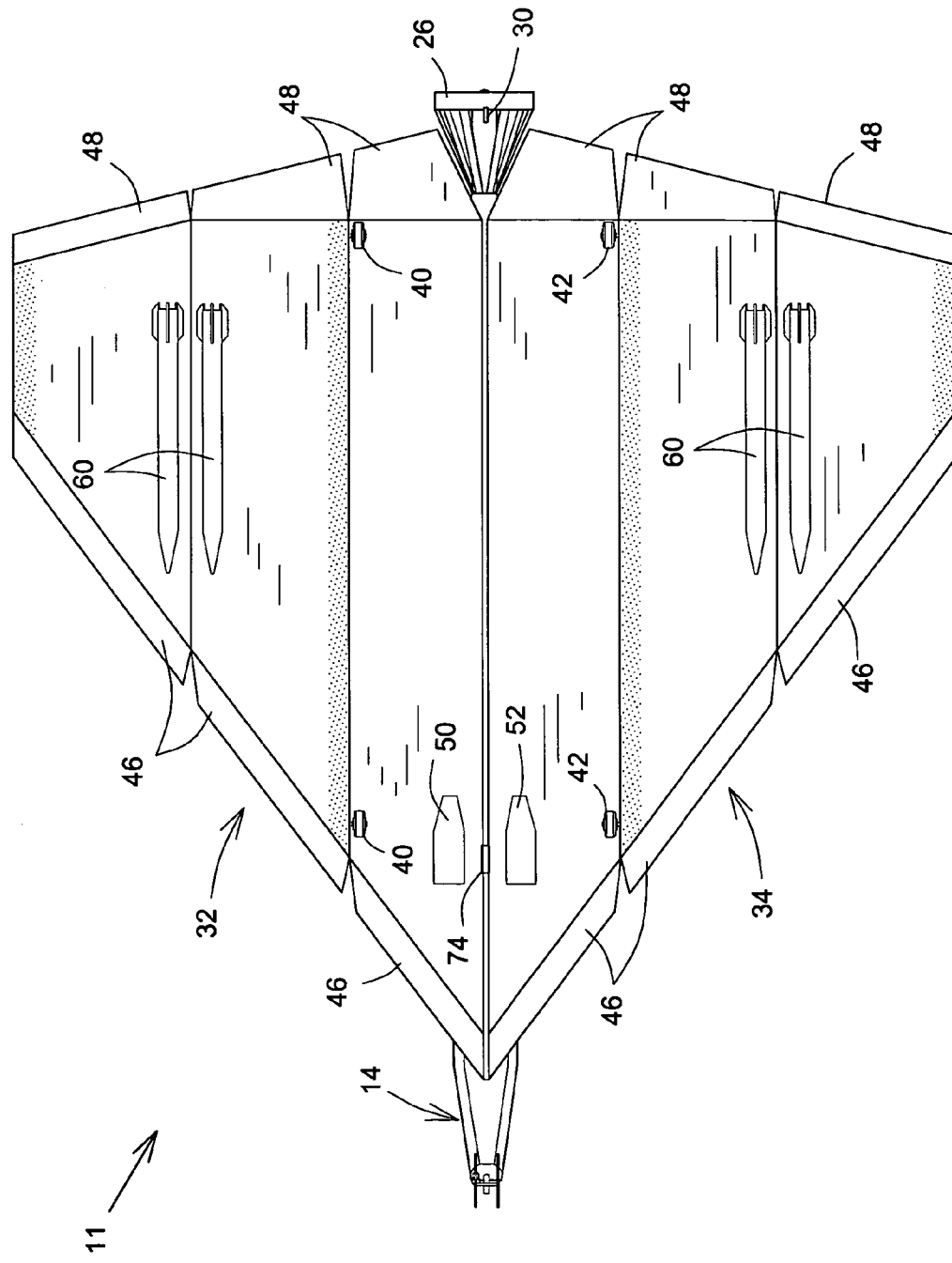
FIG. 4 is an under view of the UAV shown in FIG. 1.
Figure 5:
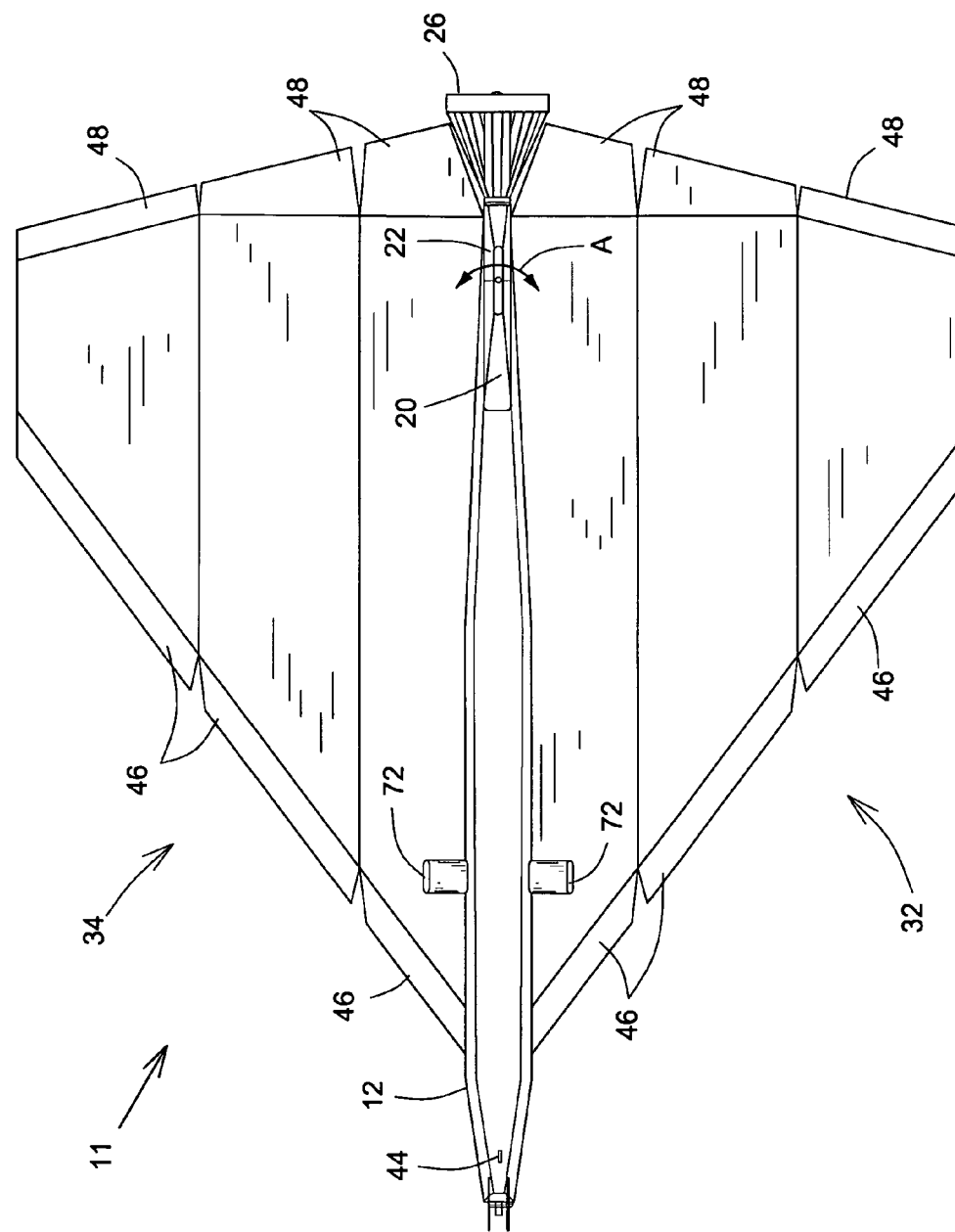
FIG. 5 is a plan view of the UAV shown in FIG. 1.

The ordnance for the vehicle 11 is comprised of at least one pair of missiles 60, in this example non-guided, slung beneath the wings 32, 34 as shown, together with a cannon 70 mounted in the nose section 14. Cartridge magazines 72 for the cannon 70 are provided and as seen in FIG. 4 a suitable ejection aperture 74 for spent cartridges ejected during firing is sited beneath the fuselage 12.

In order to control the attitude of the vehicle 11 during all phases of the flight, deployment mechanisms as well as all controllable on-board equipments, a controller, schematically represented by an communication antenna 44 mounted on the fuselage 12, is also on-board the vehicle 11.

Figure 7:
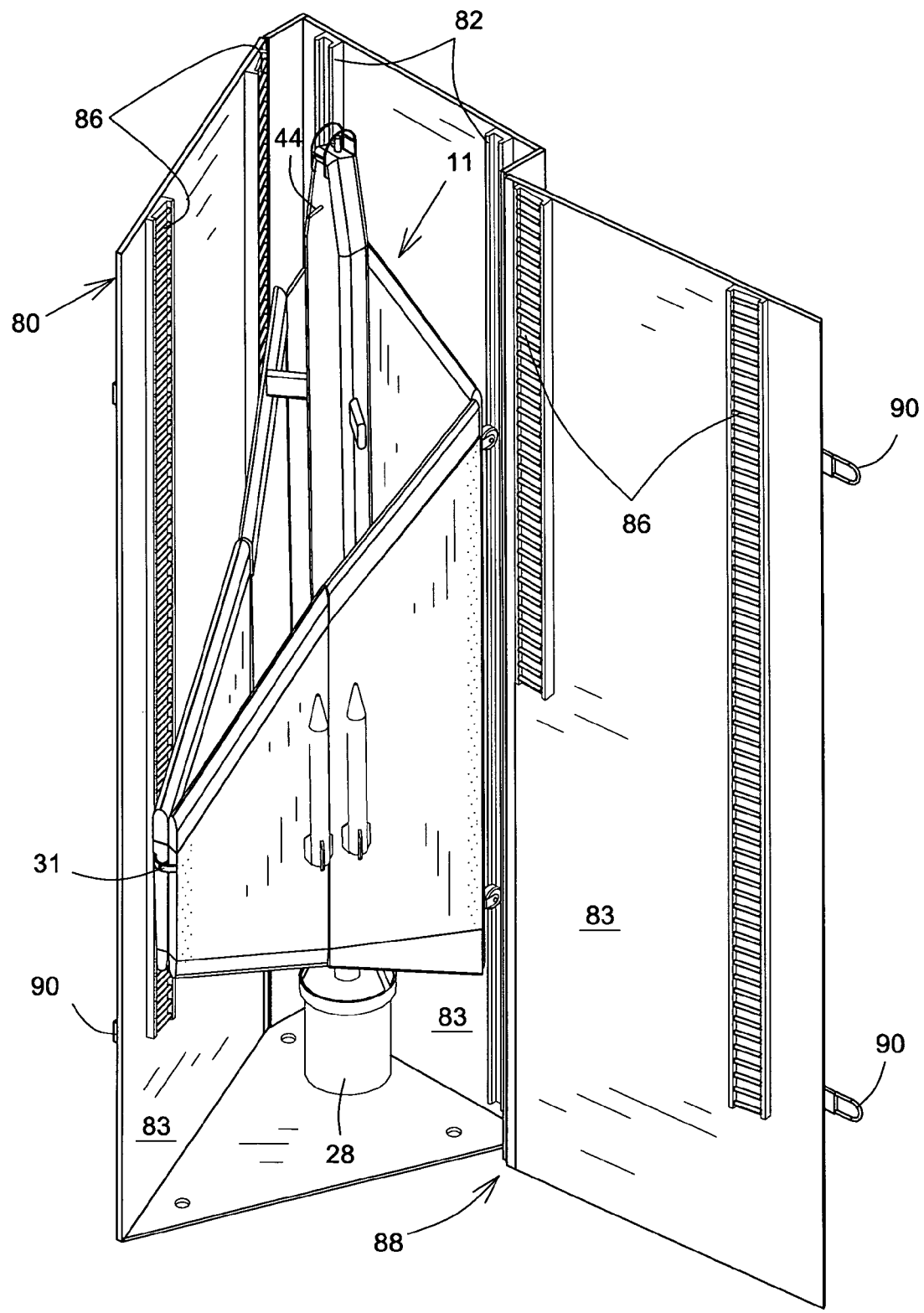
FIG. 7 is a perspective side view of the UAV shown in its launch pod with a containing wall of the pod hinged open.

Referring now particularly to FIGS. 6 and 7, a pod 80 is depicted and is of generally triangularly shaped or delta cross-section into which the vehicle 11 fits, the wheels 40, 42 locating in tracks 82 spaced apart on the inside of one of the walls 83 of the pod 80. Sets of launch rollers 86 are provided on at least two of the walls 83 as shown and are engaged by the plates 35, there being low frictional resistance to movement by virtue of the selected material. The rollers 86 provide a positive guidance for the vehicle 11 during its movement within the pod 80 and its emergence therefrom during launch. With the vehicle in the pod 80 and the wings 32, 34 folded, the wings present a delta configuration. The wing tips 33 are held together by a clamp 31 which is retractable within the tail plane 20.

As will be seen from FIG. 7 in particular one wall 83 of the pod 80 is hinged as at 88 to allow access to the inside thereof to replace the vehicle in position, suitable locking catches 90 being provided on the edge of the wall 83. The pod 83 is preferably provided with a removable cover (not shown) remote from the base of the pod.

Figure 8:
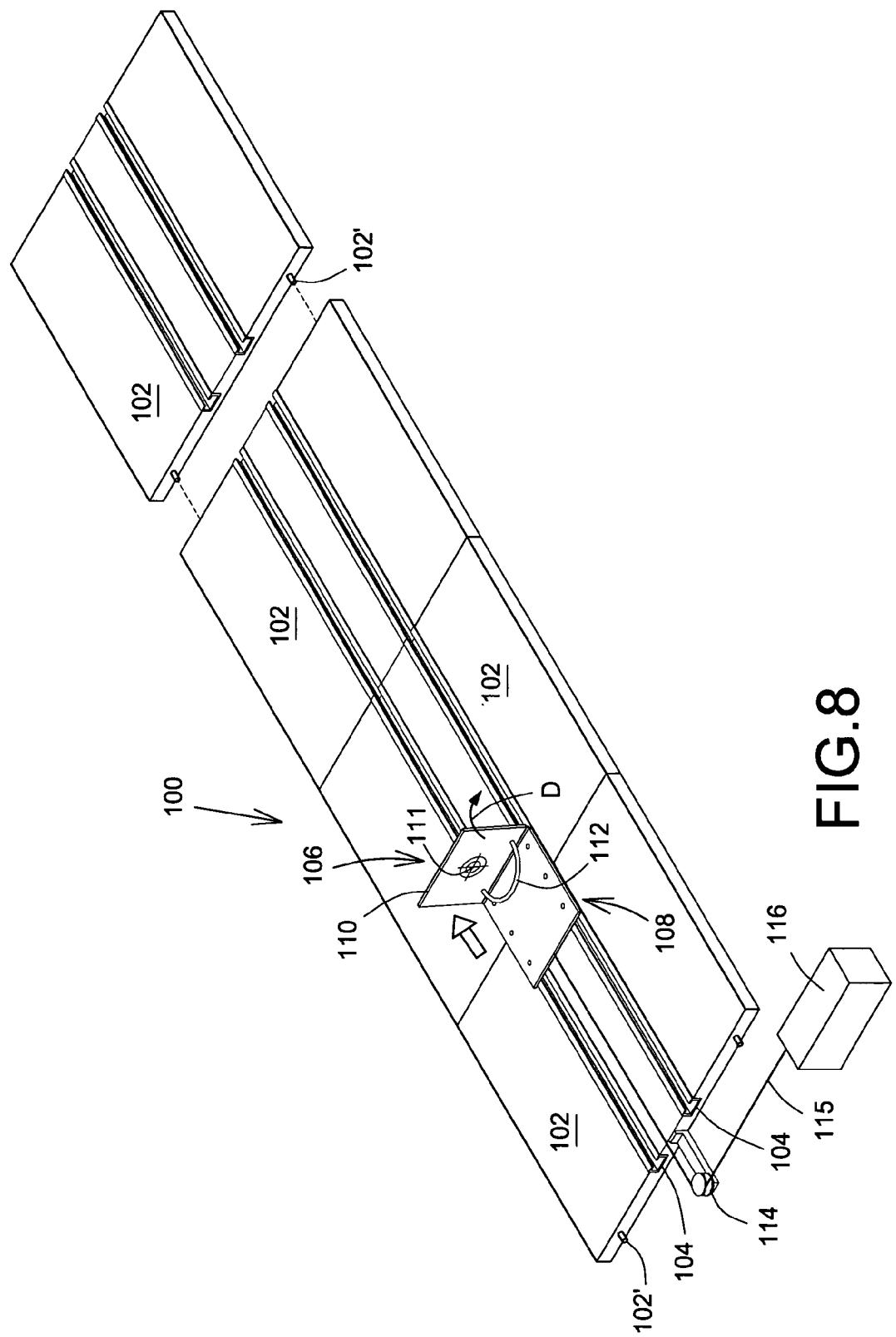
FIG. 8 is a perspective view of a landing deck for the UAV.
Figure 8A:
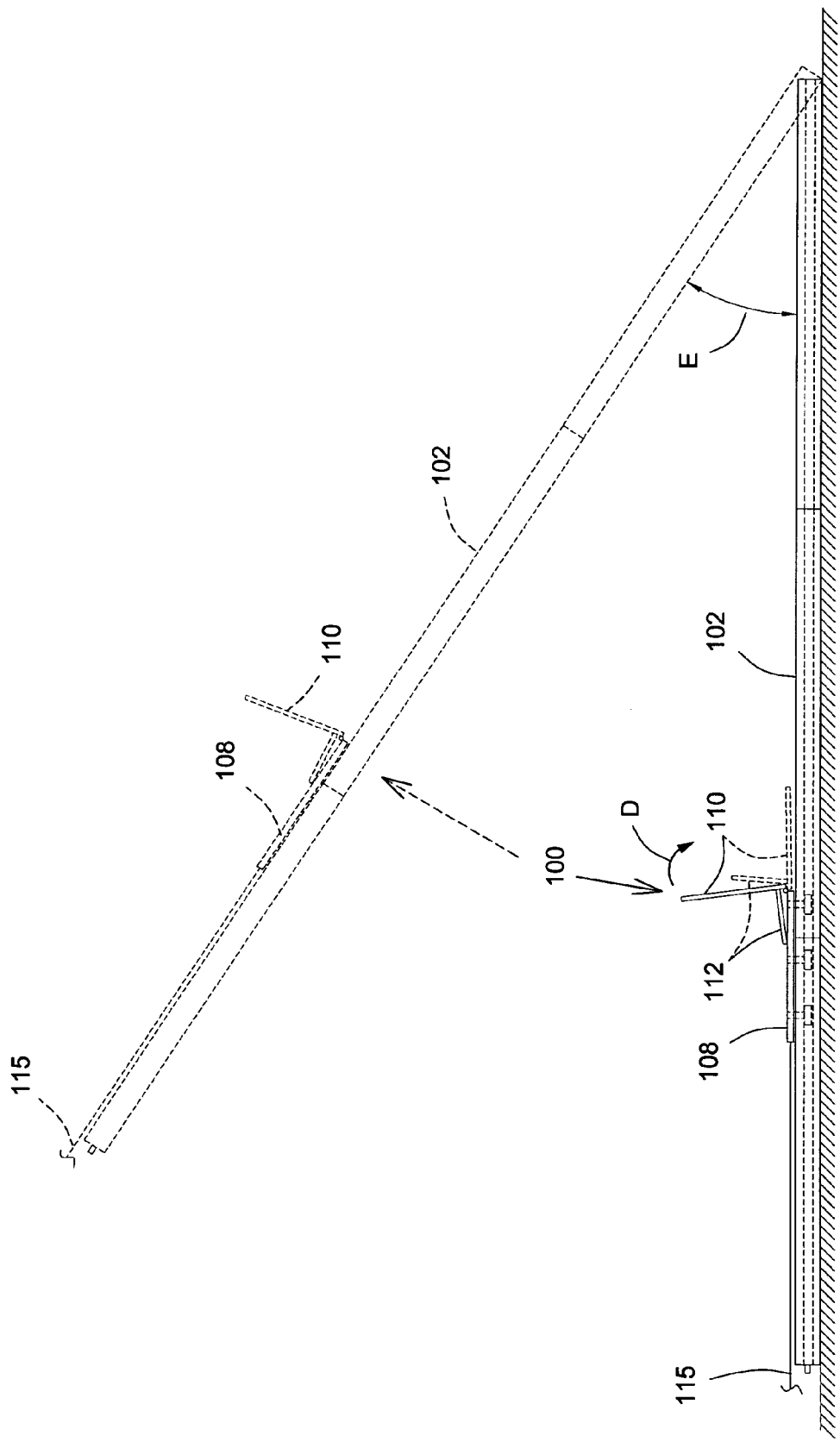
FIG. 8a is a side view of the landing deck shown in FIG. 8.

Turning now to FIGS. 8 and 8a, there is illustrated a landing deck 100, typically 10-15 m long, which is composed of a number of individual panels 102 each measuring approximately 1 m square (1 meter long by 1 meter wide) and secured end to end by suitable fixtures (not shown) locating pegs 102' being provided to give the correct alignment. Parallel and spaced apart slideways 104 are formed in the upper surface of the panels 102 and provide a guideway 106 for a target base 108, which has pivotally (see angle D in FIGS. 8 and 8a) mounted thereon a target plate 110 provided with a target 111 located thereon and a hook engageable eye 112.

A pulley wheel 114 is mounted at one end of the deck 100 and a wire cable 115 is reeved around it for connection at one end to the target base 108 and at the other end to a braking mechanism 116 which may be mounted beneath the deck 100 or on some other static and stable structure.

FIG. 9 represents a squadron or battery 120 of unmanned air vehicles 11 all mounted in their respective pods 80 and standing on an angularly orientable (see arrow F in FIG. 9) and pivotable (see arrow G in FIG. 9) flatbed 122 of a mobile carrier 124, for example a truck 126 or such like. In this example, twelve (12) pods 80 are arranged in two rows. At least one remote control centre 144, 144' for the launch and flight of the UAVs and their respective on-board controller 44 is provided and may be at the launch site or some other suitable and safe location, or even close to the mission site. Alternatively, one to three vehicles, with their launch pods could be carried by soldiers or the like, as a backpack, in regions inaccessible by mobile carrier, typically along with corresponding remote controller.

Typically, the total range of the UAVs is from 15-20 km round trip.

Figure 10:
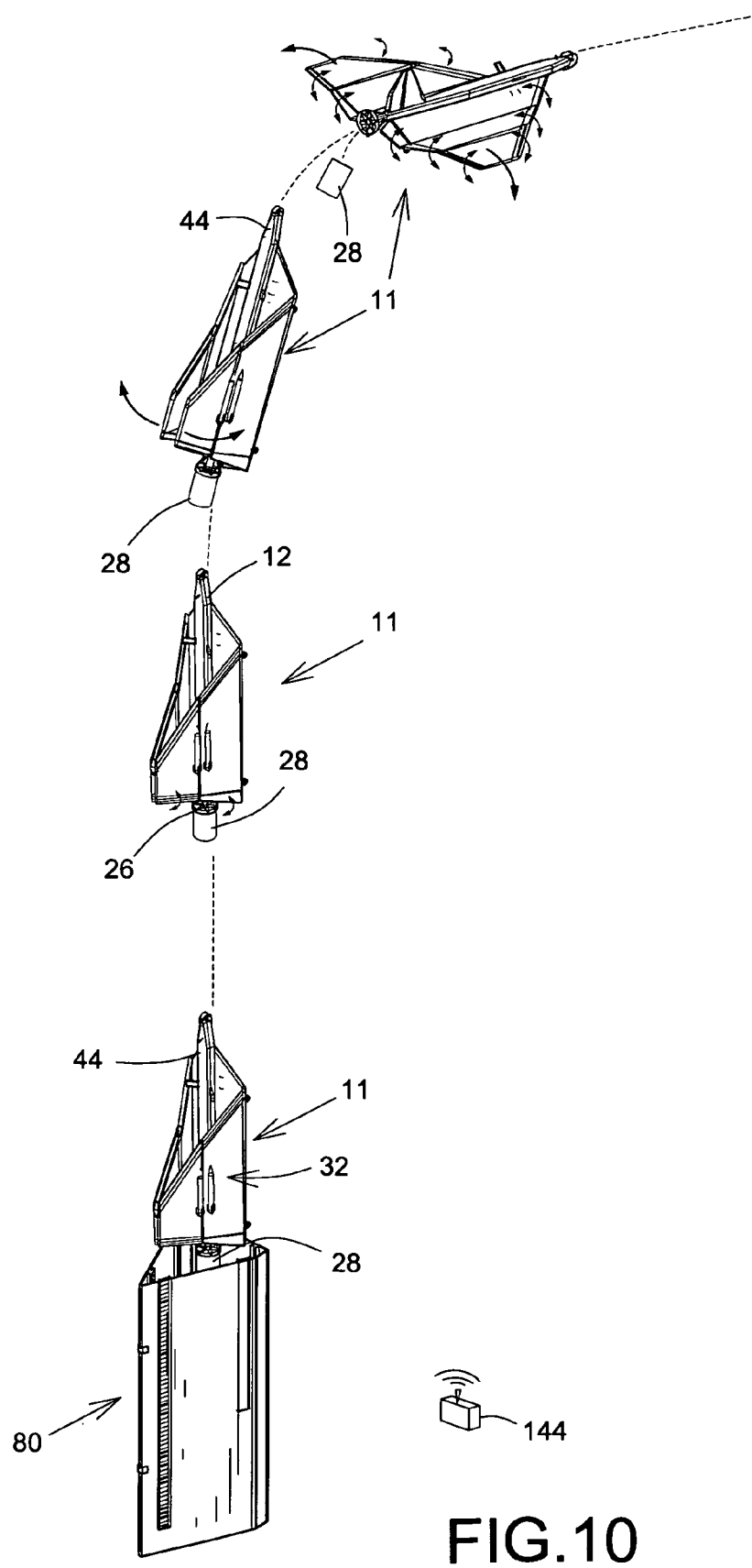
FIG. 10 is a perspective view of typical different flight phases of the UAV.

In operation, as partially and schematically exemplified in FIG. 10, the or each UAV is armed with ordnance as previously described and fuelled for the flight to be undertaken. At the moment of launch the pod 80 is opened and the jet engine 28 is fired to propel the vehicle 11 from its pod. The initiation of ignition is effected remotely from the pod 80 as is the control of the vehicle once airborne. The thrust of the engine 28 forces the vehicle to ascend from the pod 80 and during its ascent trajectory the flight pattern is or may be adjusted by appropriate use of the flaps 46 and ailerons 48 to ensure stability in the selected flight path, similarly to what is done for a typical rocket. Jet engine 28 is jettisoned once its fuel is spent (see upper left portion of FIG. 10). Of course, subsequent adjustment during flight to and from the target/mission site is possible by using these controls; the camera 18 providing visual assistance in this respect together with any other instrumentation that may be mounted on or in the vehicle. The deployment mechanisms 43 unfold the wings when appropriate for flight at the selected altitude and the unfolded wings in plan view substantially present a delta configuration.

Once the target site is found, the missiles 60 are let loose and the cannon 70 fired at the target to destroy it. Assuming the squadron 120 of vehicles 11 has been dispatched to the target site and that none of the vehicles has been knocked out, the vehicles are regrouped for return to the launch site or to base as the case may be.

At the point of landing, the vehicle is given an appropriate descent path to contact the landing deck 100. The cage 15 on the nose 14 of the fuselage 12 impacts the target plate 110, which pivots to bring up the eye 112 engagement with the landing hook 30. Upon such engagement the vehicle pulls the wire cable 115 against the braking mechanism 116, which effectively decelerates and eventually arrests the vehicle 11. For the purpose of effective landing the deck may be angularly orientated as desired (see angle A of FIG. 8a), typically about 45° to the horizontal, or even closer to the vertical, depending on the actual landing site and other space constraints.

Once the vehicle has landed on return from a mission, it will be refueled, rearmed and checked before reloading in a pod for subsequent use.

The vehicle herein proposed affords a controllable means of unmanned flight for use in military operations, viz. to scout, explore and or investigate a desired area, to escort and/or protect friendly forces, personnel and equipment, for example armoured divisions, for securing and defining the boundaries of operations, the detection of mines and their clearance, for escorting helicopters, boats and other vehicles and for the protection of transport planes or bombers from SAM (surface-to-air) missiles. The uses for this invention are legion and also include peaceful activities, such as weather observance or ordinance surveying.

The flaps 46 and ailerons 48 could be so adjusted to provide the vehicle 11 with additional lift that would make the vehicle to behave as a conventional glider, for extended surveillance mission or the like, or unpowered return flight.

Although the root part 32a, 34a of the wings are fixed to the fuselage 12 for flight condition, they could eventually be selectively foldable towards each other relative to the bottom of the fuselage for reduced volume during transportation/handling thereof, such that the respective succeeding contiguous parts 32b, 32c and 34b, 34c are substantially oriented parallel and in a side-by-side relationship relative to each other, preferably without any cartridge magazines 72, jet engines 50, 52 and/or wheels 40, 42 or the like equipment.

Furthermore, the different components and elements of the present vehicle 11 are typically all modular such that they can easily be disassembled and re-assembled or replaced by others whenever required, thereby allowing different UAV configurations of the present invention, depending on the specific mission type and/or needs.

Although not specifically shown herein, a plurality of gas tanks could be located within specific fuel chambers with within flexible wall partitions to control the fuel distribution with the different wing sections for a better fuel weight spreading that enhance the attitude balancing of the vehicle. Such gas tanks could include lighter-than-air gases (such as hydrogen or helium) to reduce the overall weight of the vehicle.

Although the vehicle 11 of the present invention could have any dimensions, the preferred dimensions are between about 100 cm and about 150 cm long and between about 100 cm and about 150 cm wing span, in the deployed configuration.

Although the present invention has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. An unmanned air vehicle comprising a fuselage provided with a nose adapted for the incorporation of inter alia surveillance equipment or ordnance, the fuselage being provided with a tail plane with a rudder, to each side of the fuselage is attached a foldable wing adapted to carry further equipment, each wing having a root part affixed to the fuselage and a hinged part hingeably connected to the respective root part to allow the vehicle to form a substantially triangular shape when the hinged parts are folded, each said root part and said hinged part having at least one respective controllable aileron at its trailing edge, each aileron controllable for individual control during outbound flight including the launch phase with the vehicle in the folded triangular shape, a propulsive launch engine, and at least one flight power unit for flight.

2. An unmanned air vehicle according to claim 1 wherein each wing part has controllable flaps at its leading edge, and each flap being adapted in use for individual control during outbound flight including the launch phase.

3. An unmanned air vehicle according to claim 2 further including at least one return power unit for use during the return flight, and a pod for containing the vehicle with the wings folded in the triangular shape, the pod being so constructed as to provide a launch platform for the vehicle.

4. An unmanned air vehicle according to claim 1 wherein each hinged part of respective said wing includes two contiguous parts respective to one another and hinged together such as to give to the wing foldability and a tripartite configuration.

5. An unmanned air vehicle according to claim 4 wherein deployment mechanisms are provided for moving the hinged parts into the flight mode.

6. An unmanned air vehicle according to claim 1 wherein a clamp is provided to retain the wings in the folded position, the clamp being disposed on the tail plane.

7. An unmanned air vehicle according to claim 6 wherein the clamp is accommodated within the tail plane when not in use.

8. An unmanned air vehicle according to claim 1 wherein the wings are hollow, and fuel tanks are accommodated within the wings.

9. An unmanned air vehicle according to claim 1 wherein the propulsive launch engine is a jet engine to be jettisoned in use following launch.

10. An unmanned air vehicle according to claim 3 wherein the flight power unit for flight is a motor-driven propeller powered by a fuel-fired engine.

11. An unmanned air vehicle according to claim 10 wherein a standby electric motor is provided for the propeller.

12. An unmanned air vehicle according to claim 11 wherein a bank of batteries is provided within the fuselage to power the electric motor.

13. An unmanned air vehicle according to claim 10 wherein the propeller is mounted in a propeller guard structure to which the propulsive launch engine is releasably secured.

14. An unmanned air vehicle according to claim 3 wherein the flaps and ailerons are powered by motors actuable by remote control.

15. An unmanned air vehicle according to claim 3 wherein in use the vehicle is launched from within its pod with the wings in the folded condition and during launch the flaps and ailerons are so adapted as to effect flight control as they do during normal flight when the vehicle has reached operating altitude.

16. An unmanned air vehicle according to claim 1 wherein the ordnance mounted in the nose of the fuselage is a cannon provided with cartridge magazines.

17. An unmanned air vehicle according to claim 16 wherein the fuselage is provided with discharge apertures for the ejection of spent cartridges.

18. An unmanned air vehicle according to claim 1 wherein the further equipment located beneath the wings is comprised of missiles.

19. An unmanned air vehicle according to claim 1 wherein the tail end of the fuselage is provided with a hook deployable prior to land.

20. An unmanned aerial system including the unmanned air vehicle according to claim 19 wherein a landing deck is provided and incorporates a slideway in which is reciprocally mounted a detent adapted for interengagement with the hook upon landing, the detent being affixed to an arresting wire connected to a braking mechanism.

21. An unmanned aerial system according to claim 20 wherein the landing deck is angularly orientable.

22. An unmanned air vehicle according to claim 3 wherein the pod for containing the vehicle is provided with support and guide rollers adapted to retain the vehicle in a desired path in use upon launch.

23. An unmanned air vehicle according to claim 3 wherein the return power unit for return flight is at least one jet engine.

* * * * *